United States Patent [19]

Satomi

[11] Patent Number: 5,418,413
[45] Date of Patent: May 23, 1995

[54] LINEAR PULSE MOTOR

[75] Inventor: Hirobumi Satomi, Kashiwa, Japan

[73] Assignee: Oriental Motor Co., Ltd., Tokyo, Japan

[21] Appl. No.: 166,022

[22] Filed: Dec. 14, 1993

[30] Foreign Application Priority Data

Dec. 14, 1992 [JP] Japan .................. 4-332761

[51] Int. Cl.⁶ ............................. H02K 41/02
[52] U.S. Cl. .................................. 310/12
[58] Field of Search ....................... 310/12, 14

[56] References Cited

U.S. PATENT DOCUMENTS 4,197,488  4/1980  Kant ........................ 318/135
5,208,498  5/1993  Hamajima .................... 310/12

Primary Examiner—Steven L. Stephan
Assistant Examiner—Judson H. Jones
Attorney, Agent, or Firm—Jacobson, Price, Holman & Stern

[57] ABSTRACT

It is an object of the present invention to provide a linear pulse motor which can increase the number of ampere conductors and attain a multi-phase configuration with a uniform magnetic circuit without increasing the length in the axial direction. The linear pulse motor includes a stator composed of two stator cores having 2·k·m salient poles disposed radially in an inner peripheral surface, a permanent magnet held between the stator cores and having a thickness such that a distance between centers of small stator teeth is (N+0.5) times of a tooth pitch and stator windings wound to bestride two salient poles of the stator cores, and a mover including a cylindrical core. Small teeth in the form of ring are disposed in the mover or the stator at equal pitch in the axial direction and small teeth disposed in the axial direction are formed of laminated stator iron plates or mover iron plates each rotated by $\{(360·n)/(2·k·m)\}$ degrees. The small teeth form k sets each set including m small teeth forming tooth tip portions and m small teeth forming tooth bottom portions which are arranged in order of the description.

13 Claims, 6 Drawing Sheets

LINEAR PULSE MOTOR

FIELD OF THE INVENTION AND RELATED ART STATEMENT

The present invention relates to a linear pulse motor.

FIG. 9 shows a longitudinal section of a related cylinder type linear pulse motor.

In FIG. 9, stator cores 1, 2, 3 and 4 include outer peripheral edge portions which are thick in the thickness direction thereof to form stepped rings and inner peripheral edge portions in which a plurality of small stator teeth are disposed at equal pitch in the axial direction (shaft direction). The stator cores 1 and 2 are combined to face the outer peripheral edge portions thereof with each other to thereby form a ring groove in which a ring winding 5 is held. Similarly, another ring winding 6 is held in a ring groove formed between the stator cores 3 and 4.

The cylinder type linear pulse motor includes a phase formed by the stator cores 1 and 2 and the ring winding 5 and another phase formed by the stator cores 3 and 4 and the ring winding 6.

A permanent magnet 7 in the form of a ring is held by the stator cores forming the two phases and is magnetized in the axial direction. A mover core 8 is cylindrical and includes an outer periphery on which a plurality of small mover teeth are formed at equal pitch in the axial direction.

The small stator teeth and the small mover teeth have the following positional relation. That is, when the small stator teeth formed in the stator core 4 are just opposite to the small mover teeth, the small stator teeth formed in the stator core 3 are shifted by 2/4 of the pitch of the teeth in the axial direction as compared with the stator core 4. Further, the small stator teeth formed in the stator core 2 are shifted by ¼ of the pitch of the teeth in the axial direction as compared with the stator core 4. The small stator teeth formed in the stator core 1 are shifted by ¾ of the pitch of the teeth in the axial direction as compared with the stator core 4.

With such structure, the cylinder type linear pulse motor constitutes a two-phase hybrid type linear pulse motor.

However, the cylinder type linear pulse motor as structured above has a defect that the driving force thereof is low since the accommodation portion of the winding can not be provided largely and the number of ampere conductors per phase can not be increased. Further, since the stator cores 1 and 4 are located far from the permanent magnet 7 as compared with the stator cores 2 and 3, there are drawbacks that a magnetic circuit thereof is uneven and there is a difference in the driving force depending on an excitation phase. Further, there is a problem that the axial length of the motor is long since each of the phases is disposed in the axial direction theoretically.

OBJECT AND SUMMARY OF THE INVENTION

The present invention has been made in view of the above problems and an object of the present invention is to provide a linear pulse motor which can increase the number of ampere conductors per pole and attain a multi-phase configuration with a uniform magnetic circuit without increasing the length in the axial direction.

In order to achieve the above object, the linear pulse motor according to the present invention includes the following configuration.

The linear pulse motor according to the present invention including a stator composed of two stator cores disposed in the axial direction (shaft direction) and having 2·k·m salient poles (k is a positive integer and m is the number of phases) disposed radially in an inner peripheral surface thereof, a permanent magnet in the form of ring held between the two stator cores and magnetized in the axial direction, and stator windings wound to bestride two salient poles in which the two stator cores overlap each other, and a mover made of a cylindrical core supported within the stators movably in the axial direction (shaft direction), wherein a thickness of the permanent magnet in the axial direction is set so that a distance between centers of small stator teeth disposed in the two stator cores in the axial direction is (N+0.5) times of a tooth pitch (where N is a positive integer), when substantially ring-shaped small teeth are disposed in the mover or the stators at equal pitch in the axial direction, small teeth disposed in the axial direction of the stators or the mover corresponding thereto are formed of laminated stator iron plates or mover iron plates each rotated by $\{(360 \cdot n)/(2 \cdot k \cdot m)\}$ degrees (n is 1 or $2 \cdot p \cdot m \pm 1$ or $2 \cdot k \cdot m - 1$ where p is an integer satisfying $1 \leq p < k$), small teeth of the stator iron plates or the mover iron plates form k sets each set including m small teeth forming tooth tip portions and m small teeth forming tooth bottom portions which are arranged in a circumferential direction in order of the description.

According to the present invention, a multi-phase linear pulse motor is configured without increased axial length. Further, since the windings are disposed in the circumferential direction in the stator cores so that the windings are wound on salient poles, the number of ampere conductors can be increased and the small linear pulse motor with large driving force is configured. Rotative laminated structure of stator iron plates or mover iron plates can form the stator cores or the mover core, so that the lamination core technique of a conventional rotation type stepping motor is applicable and the productivity is excellent.

DETAILED DESCRIPTION OF A PREFERRED EMBODIMENT

An embodiment of the present invention is now described with reference to FIGS. 1 to 8.

Figure 1:
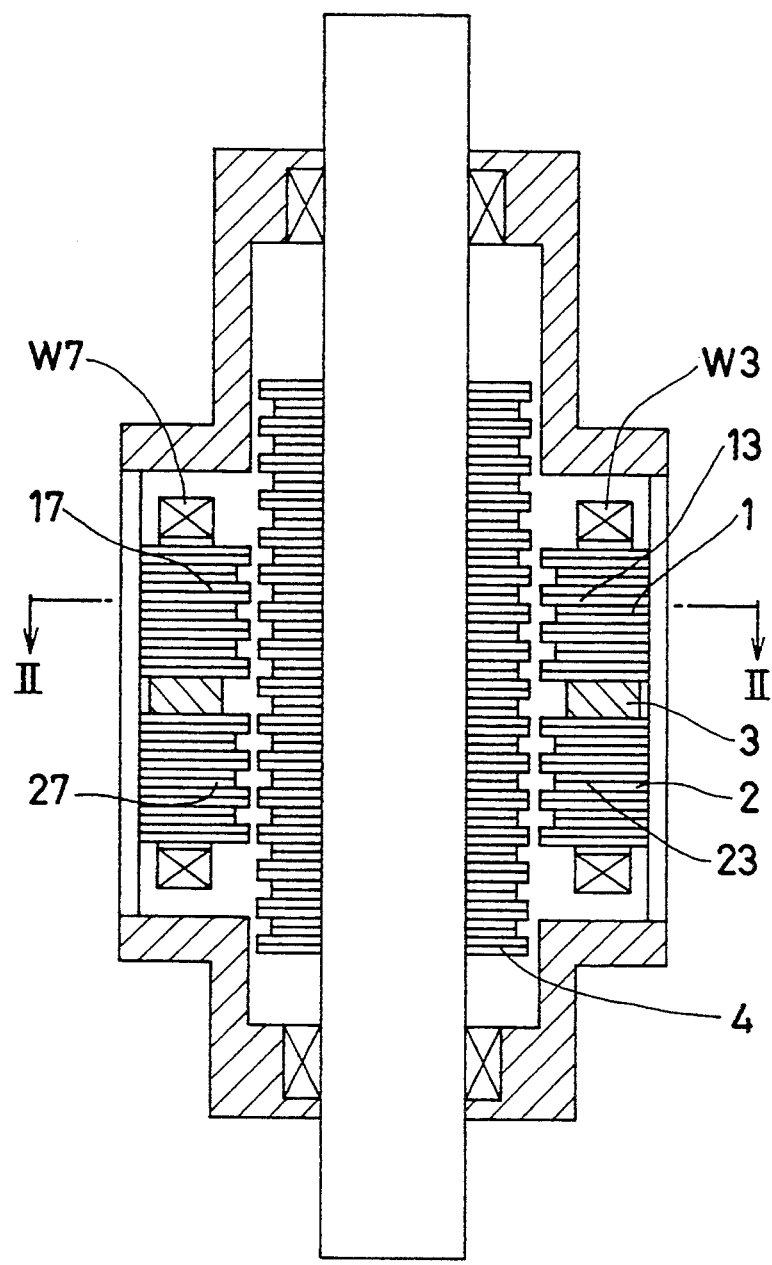
FIG. 1 is a longitudinal sectional view of an embodiment of a linear pulse motor according to the present invention.
Figure 2:
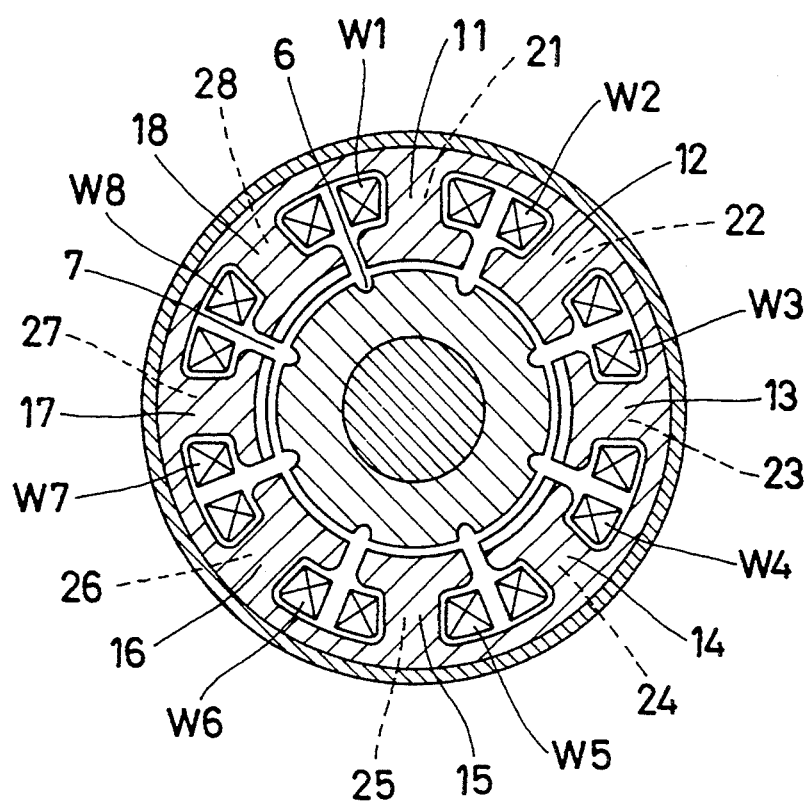
FIG. 2 is a cross-sectional view taken along line II—II in the embodiment of FIG. 1.

FIG. 1 is a longitudinal sectional view illustrating an embodiment of a linear pulse motor according to the present invention. FIG. 2 is a cross-sectional view taken along line II—II of FIG. 1 and in which the numerical values of the abovementioned k and m are set to $k=2$ and $m=2$.

In FIGS. 1 and 2, eight salient poles 11 to 18 are disposed in a stator core 1 and eight salient poles 21 to 28 are also disposed in a stator core 2. A stator winding W1 is wound to bestride the two salient poles 11 and 21 in which the stator cores 1 and 2 overlap each other. Similarly, stator windings W2, W3 to W8 are also wound to bestride pairs of salient poles 12 and 22, 13 and 23 to 18 to 28, respectively, in which the stator cores 1 and 2 overlap each other.

A permanent magnet 3 is held between the stator cores 1 and 2 and is magnetized in the axial direction. The thickness of the permanent magnet 3 in the axial direction is set so that a distance between centers of respective small stator teeth disposed in the two stator cores 1 and 2 is $(N+0.5)$ times (N is a positive integer) of a tooth pitch.

A mover core 4 includes mover iron plates of a large outer diameter and mover iron plates of a small outer diameter which are alternately laminated on each other to have a thickness of a half of the tooth pitch of the small stator teeth. Formed on the outer peripheral surface of the mover core 4 are small mover teeth in the form of ring disposed at the same pitch as the tooth pitch of the small stator teeth.

Grooves 6 are disposed in the axial direction on the outer peripheral surface of the mover core 4. The grooves 6 have a width which is substantially equal to that of winding insertion inlets 7 formed between the salient poles 11 to 18 of the stator core 1 and the salient poles 21 to 28 of the stator core 2 and are opposite to the winding insertion inlets 7, so that the grooves 6 serve to suppress rotary movement of the mover by means of magnetic attractive force. Thus, even if the grooves 6 are not provided, there is no problem in operation.

Figure 3:
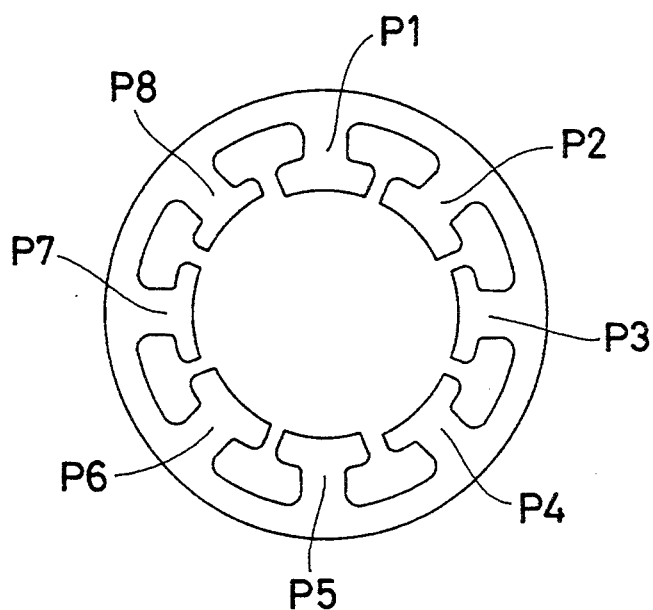
FIG. 3 is a plan view of a stator iron plate constituting a stator core of FIG. 2.

FIG. 3 shows a stator iron plate forming the stator core 1 of FIG. 2. Salient poles P1, P2, P5 and P6 of eight salient poles P1 to P8 have a small inner diameter to form tooth tip portions of the small stator teeth. Further, salient poles P3, P4, P7 and P8 have a large inner diameter to form tooth bottom portions of the small stator teeth.

Figure 4:
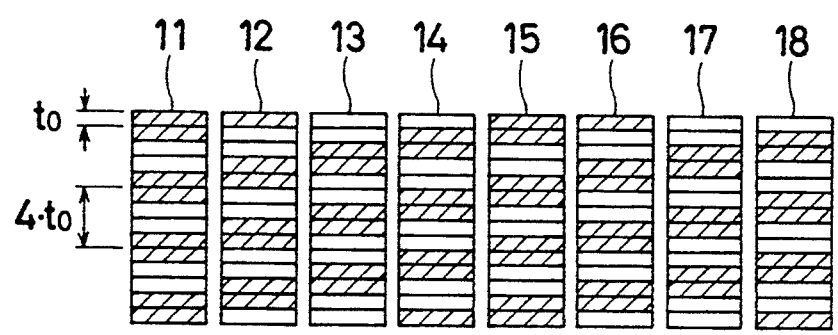
FIG. 4 is an expanded diagram of small stator teeth as viewed from a mover side when the stator iron plates are laminated with rotated by a predetermined angle.

FIG. 4 shows the eight salient poles 11 to 18 as viewed from the side of the mover when the stator iron plates are laminated with the plates each being rotated clockwise by 45 degrees. Black portions (hatched portions) indicate the tooth tip portions and white portions (no hatched portions) indicate the tooth bottom portions. When the thickness of the stator iron plate is $t_0$, small teeth having a tooth pitch of $4 \cdot t_0$ and a tooth thickness of $2 \cdot t_0$ are formed in each of the salient poles by the rotative lamination of the stator iron plates. Furthermore, the small teeth of the salient poles 12, 13 and 14 are shifted by ¼, 2/4 and ¾ of the tooth pitch, respectively, relative to the salient pole 11. The small teeth of the salient poles 15, 16, 17 and 18 have the same positional relation as the small teeth of the salient poles 11, 12, 13 and 14.

On the other hand, the positional relation of the small teeth of the salient poles in which the stator cores 1 and 2 overlap each other is set so that a distance between the small teeth is $(N+0.5)$ times of the tooth pitch where N is a positive integer by adjusting the thickness of the permanent magnet 3 as described above. Accordingly, the small tooth of the salient pole 21 is shifted by 2/4 of the tooth pitch relative to the salient pole 11. Further, the small teeth of the salient poles 22, 23 to 28 are shifted by ¾, 4/4, ¼, 2/4, ¾, 4/4 and ¼ of the tooth pitch, respectively.

Figure 5:
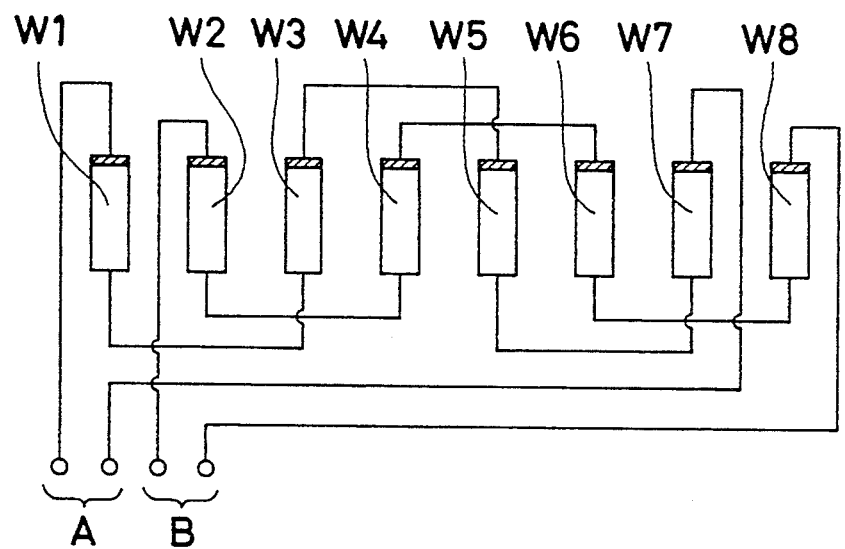
FIG. 5 is a circuit diagram of stator windings.

Accordingly, as shown in FIG. 5, the windings are connected so that the salient pole on which the windings W1 and W5 are wound forms a phase A and the salient pole on which the windings W3 and W7 are wound forms an inverse phase of the phase A to thereby form one phase and so that the salient pole on which the windings W2 and W6 are wound forms a phase B and the salient pole on which the windings W4 and W8 forms an inverse phase of the phase B to thereby form the other phase, so that a two-phase hybrid type linear pulse motor can be structured. A basic movement for each step in this case is equal to ¼ of the tooth pitch, that is, the thickness $t_0$ of the stator iron plate.

Figure 6:
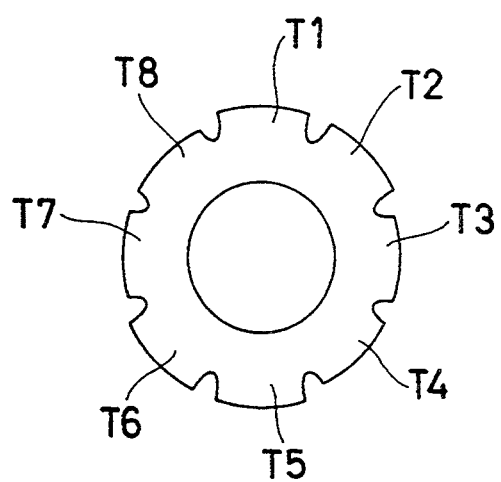
FIG. 6 is a plan view showing an example of a mover iron plate.

FIG. 6 shows an example of the mover iron plate. In eight small teeth T1 to T8, the small teeth T1 and T2 having large tooth height and the small teeth T3 and T4 having small tooth height constitute one set. Further, the small teeth T5 and T6 having large tooth height and the small teeth T7 and T8 having small tooth height constitute the other set. The mover iron plate includes two sets in total.

Figure 7:
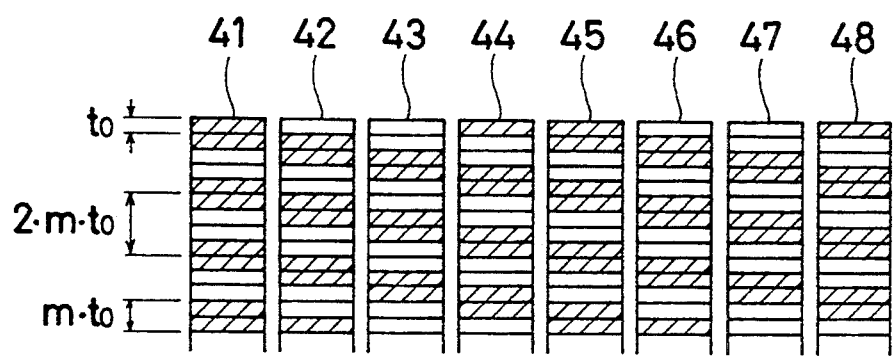
FIG. 7 is an expanded diagram of small mover teeth as viewed from a stator side when the mover iron plates are laminated with rotated by a predetermined angle.

FIG. 7 shows eight small mover teeth when the mover iron plates are laminated with the iron plates being rotated by 45 degrees. Black portions (hatched portions) indicate the tooth tip portions and white portions (no hatched portions) indicate the tooth bottom portions. A small teeth having a tooth pitch of $4 \cdot t_0$ and a tooth thickness of $2 \cdot t_0$ is formed in the surface of the mover by the rotative lamination of the mover iron plates. $t_0$ is a thickness of the mover iron plate, which is equal to the thickness of the stator iron plate. Furthermore, the small mover tooth 42 opposite to the salient pole 12, the small mover tooth 43 opposite to the salient pole 13 and the small mover tooth 44 opposite to the salient pole 14 are shifted by ¼, 2/4 and ¾ of the tooth pitch, respectively, relative to the salient pole 11. The small mover teeth 45, 46, 47 and 48 opposite to the salient poles 15, 16, 17 and 18, respectively, have the same positional relation as the small mover teeth 41, 42, 43 and 44 opposite to the salient poles 11, 12, 13 and 14, respectively.

Since the positional relation of the small teeth of the salient poles in which the stators 1 and 2 overlap each other is set so that a distance between the small teeth is $(N+0.5)$ times of the tooth pitch as described above when N is a positive integer, the small tooth 41 of the mover opposite to the salient pole 21 is shifted by 2/4 of the tooth pitch relative to the salient pole 11 and the small teeth 42, 43 to 48 of the mover opposite to the salient poles 22, 23 to 28 are shifted by ¾, 4/4, ¼, 2/4, ¾, 4/4 and ¼ of the tooth pitch, respectively. Accordingly, a two-phase hybrid type linear pulse motor can be configured by connection shown in FIG. 5.

Figure 8:
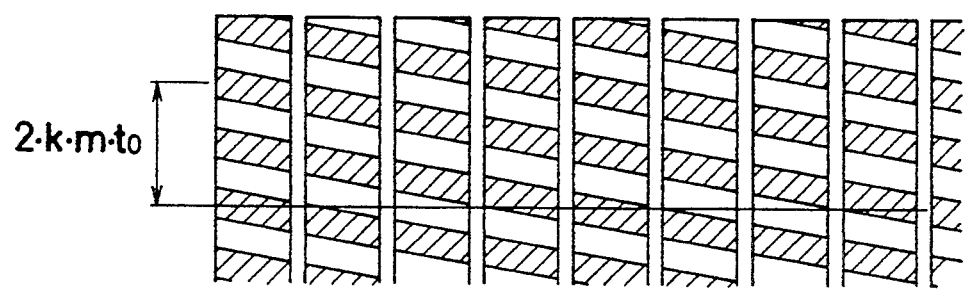
FIG. 8 is an expanded diagram of the small mover teeth corresponding to FIG. 7.
Figure 9:
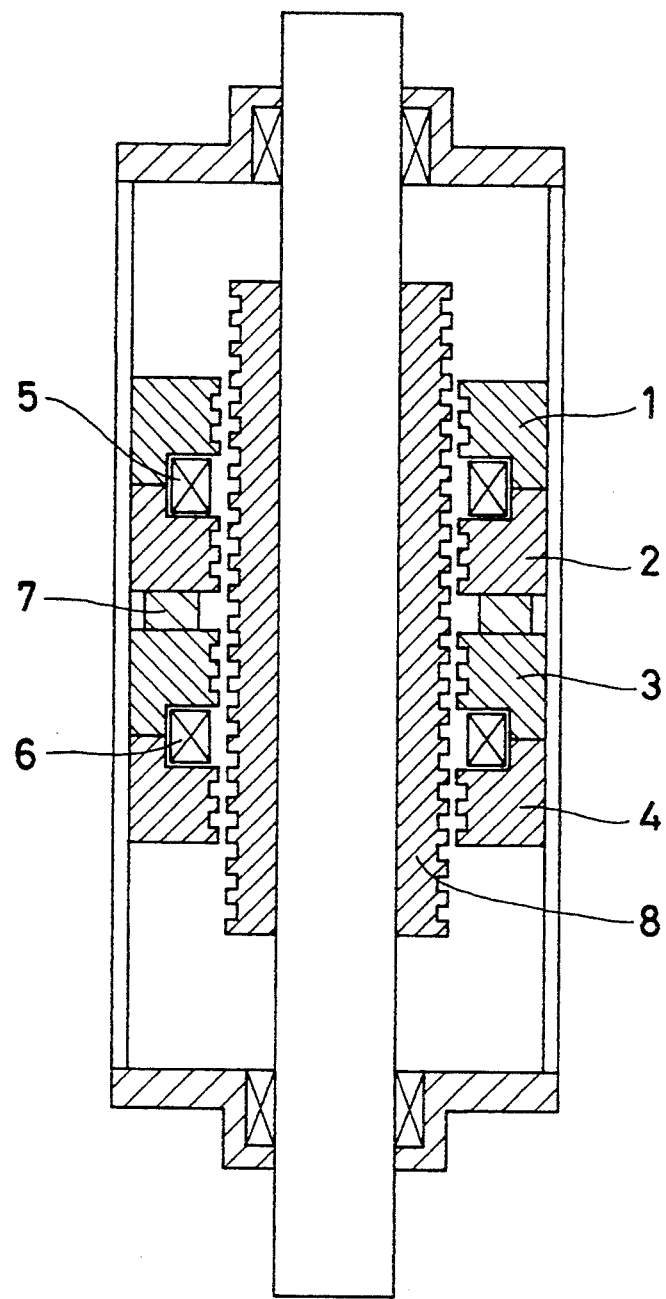
FIG. 9 is a longitudinal sectional view of a related cylinder type linear pulse motor.

On the other hand, the configuration of the small mover teeth of FIG. 7 can be replaced by the configuration of FIG. 8, which is the same structure as a helical screw of k lines having a tooth pitch of $2 \cdot k \cdot m \cdot t_0$ and can be manufactured easily by mechanical work such as grinding or rolling.

It will be understood from FIG. 7 that when the thickness of the rotatively laminated iron plate is $t_0$, the tooth thickness of the small tooth structured by the rotative lamination is $m \cdot t_0$ and the pitch of the small tooth is $2 \cdot m \cdot t_0$. Further, a predetermined number of iron plates having a thickness of $t_1$ are laminated without rotation to have a thickness $t_0$ and the laminated iron plates can be rotated by a predetermined angle each and laminated as a unit. Thus, movement $t_0$ in one step can be set with somewhat freedom.

I claim:

1. A linear pulse motor including a stator having two stator cores disposed in an axial direction and provided with even-numbered salient poles disposed radially inside thereof and a plurality of small stator teeth disposed in an inner peripheral surface thereof in the axial direction, a permanent magnet held between said two stator cores and magnetized in the axial direction, and stator windings each wound to bestride two salient poles in which said two stator cores overlap each other, and a mover including a cylindrical core supported within said stator movably in the axial direction and small mover teeth disposed in an outer peripheral surface at equal pitch in the axial direction, wherein a thickness of said permanent magnet in the axial direction is set so that a distance between centers of said small stator teeth disposed in said two stator cores in the axial direction is (N+0.5) times (N is a positive integer) of a tooth pitch, and said small stator teeth are formed of laminated stator iron plates forming said stator cores with said stator iron plates each being rotated by a predetermined angle.

2. A linear pulse motor according to claim 1, wherein when k is an positive integer and m is the number of phases, said stator iron plates forming said stator cores have $2 \cdot k \cdot m$ salient poles, and said salient poles form k sets each set including m salient poles forming tooth tip portions and m salient poles forming tooth bottom portions which are arranged in order of the description in an inner peripheral direction of said stator iron plates and are laminated with each rotated by an angle of $\{(360 \cdot n)/(2 \cdot k \cdot m)\}$ degrees (where n is 1 or $2 \cdot p \cdot m \pm 1$ or $2 \cdot k \cdot m - 1$ where p is an integer satisfying $1 \leq p < k$).

3. A linear pulse motor according to claim 2, comprising $2 \cdot k \cdot m$ (k is a positive integer and m is the number of phases) grooves disposed in the axial direction in the outer peripheral surface of said mover core and at equal pitch in an peripheral direction, a width of said grooves being substantially equal to a width of winding insertion inlets between said salient poles of said stator cores, said grooves being opposite to said winding insertion inlets.

4. A linear pulse motor according to claim 1, wherein said stator iron plates are formed by laminating iron plates thinner than said stator iron plates without rotation of said thinner iron plates to have a predetermined lamination thickness, and said stator cores are formed by laminating said stator iron plates with each rotated by a predetermined angle.

5. A linear pulse motor according to claim 1, wherein said mover cores are formed of two kinds of laminated mover iron plates constituting said small mover teeth, one having a large outer diameter and the other having a small outer diameter.

6. A linear pulse motor according to claim 1, wherein tooth tip portions and tooth bottom portions of said mover cores are formed by mechanically working a cylindrical magnetic member.

7. A linear pulse motor including a stator having two stator cores disposed in an axial direction and provided with even-numbered salient poles disposed radially inside thereof and a plurality of small stator teeth disposed in an inner peripheral surface thereof in the axial direction, a permanent magnet held between said two stator cores and magnetized in the axial direction, stator windings each wound to bestride two salient poles in which said two stator cores overlap each other, and small ring teeth cut by winding insertion inlets and disposed at equal pitch in the axial direction in a surface of said stator opposite to a mover, and a mover including a cylindrical core supported within said stator movably in the axial direction, wherein a thickness of said permanent magnet in the axial direction is set so that a distance between centers of said small stator teeth disposed in said two stator cores in the axial direction is (N+0.5) times (N is a positive integer) of a tooth pitch, and said small mover teeth disposed in the axial direction are formed by laminating mover iron plates with said mover iron plates each being rotated by a predetermined angle.

8. A linear pulse motor according to claim 7, wherein said mover iron plates are formed by laminating iron plates thinner than said mover iron plates without rotation of said thinner iron plates to have a predetermined lamination thickness, and said mover cores are formed by laminating said mover iron plates with each rotated by a predetermined angle.

9. A linear pulse motor according to claim 7, wherein when k and m are an positive integer and the number of phases, respectively, and said stator cores have $2 \cdot k \cdot m$ salient poles, said mover iron plates forming said mover opposite to said stators have $2 \cdot k \cdot m$ small teeth, and said small teeth form k sets each set including m small teeth having large tooth height and m small teeth having small tooth height which are arranged in order of the description in a peripheral direction of said mover iron plates and are laminated with each rotated by an angle of $\{(360 \cdot n)/(2 \cdot k \cdot m)\}$ degrees (where n is 1 or $2 \cdot p \cdot m \pm 1$ or $2 \cdot k \cdot m - 1$ where p is an integer satisfying $1 \leq p < k$).

10. A linear pulse motor according to claim 9, wherein the tooth height of said small teeth having a small tooth height is zero.

11. A linear pulse motor according to claim 7, wherein said stator cores are formed of two kinds of laminated stator iron plates, one having a small inner diameter and constituting stator tooth tip portions and the other having a large inner diameter and constituting stator tooth bottom portions.

12. A linear pulse motor according to claim 7, wherein tooth tip portions and tooth bottom portions of said stator cores are formed by mechanical working.

13. A linear pulse motor including a stator having two stator cores disposed in an axial direction and provided with even-numbered salient poles disposed radially inside thereof and a plurality of small stator teeth disposed in an inner peripheral surface thereof in the axial direction, a permanent magnet held between said two stator cores and magnetized in the axial direction, stator windings each wound to bestride two salient poles in which said two stator cores overlap each other, and small ring teeth cut by winding insertion inlets and disposed at equal pitch in the axial direction in a surface of said stator opposite to a mover, and a mover including a cylindrical core supported within said stator movably in the axial direction, wherein a thickness of said permanent magnet in the axial direction is set so that a distance between centers of said small stator teeth disposed in said two stator cores is (N+0.5) times (N is a positive integer) of a tooth pitch, and when said stator core has 2·k·m salient poles (where k is a positive integer and m is the number of phase), helical small teeth of k lines are formed in an outer peripheral surface of said mover at pitch equal to k times of the tooth pitch of said small stator teeth and movement of the mover in a rotational direction is restricted mechanically.

* * * * *